US007106019B2

(12) United States Patent
Becerra et al.

(10) Patent No.: US 7,106,019 B2
(45) Date of Patent: Sep. 12, 2006

(54) DIGITAL COMMUNICATION LINK

(75) Inventors: Roger C. Becerra, Fort Wayne, IN (US); William R. Archer, Fort Wayne, IN (US); Brian L. Beifus, Fort Wayne, IN (US); Mark A. Brattoli, Fort Wayne, IN (US)

(73) Assignee: Regal-Beloit Corporation, Beloit, WI (US)

( * ) Notice: Subject to any disclaimer, the term of this patent is extended or adjusted under 35 U.S.C. 154(b) by 0 days.

(21) Appl. No.: 09/681,221

(22) Filed: Feb. 27, 2001

(65) Prior Publication Data

US 2002/0117986 A1 Aug. 29, 2002

(51) Int. Cl.
*H01R 39/46* (2006.01)

(52) U.S. Cl. ........................ 318/439; 318/68; 318/138; 318/254; 318/471

(58) Field of Classification Search ................. 318/34, 318/53, 59, 62, 66, 68, 138, 254, 439, 471, 318/480

See application file for complete search history.

(56) References Cited

U.S. PATENT DOCUMENTS

| | | | | |
|---|---|---|---|---|
| 5,220,255 | A * | 6/1993 | Alford | 318/254 |
| 5,275,012 | A | 1/1994 | Dage et al. | |
| 5,410,230 | A | 4/1995 | Bessler et al. | |
| 5,485,953 | A | 1/1996 | Bassett et al. | |
| 5,492,273 | A | 2/1996 | Shah | |
| 6,262,550 | B1 * | 7/2001 | Kliman et al. | 318/565 |

* cited by examiner

*Primary Examiner*—Marlon Fletcher
(74) *Attorney, Agent, or Firm*—Armstrong Teasdale

(57) ABSTRACT

A serial interface circuit electrically connected to a controller to control an electric motor. The interface circuit includes a controller circuit and a motor circuit. The controller circuit includes a transmitter and a receiver circuit, and the motor circuit includes a transmitter circuit and a receiver circuit. The interface interrogates the motor to acquire status and diagnostic information by receiving commands from the controller, adjusts a voltage level to a desired level, outputs the voltage signal to command and control the motor, and receives a voltage response from the motor.

40 Claims, 3 Drawing Sheets

DIGITAL COMMUNICATION LINK

BACKGROUND OF THE INVENTION

This invention relates generally to electrical motors, and more particularly to a digital communications link to control and interrogate a variable speed motor used in air moving systems.

Electronically commutated motors (ECMs) are used in a wide variety of applications because they are more efficient than known standard induction motors. ECMs include the efficiency and speed control advantages of a DC motor and minimize the disadvantages of DC motors, e.g., carbon brush wear, short life span, and noise. In Heating, Ventilation and Air Conditioning (HVAC) systems, as well as, known commercial air distributions systems, ECMs automatically adjust blower speed to meet a wide range of airflow requirements. Known ECMs use microprocessor technology to control fan speed, torque, air flow, and energy consumption.

Conventional blower motors are designed to operate at one speed, however, variable speed ECMs can operate at a wide range of speeds. Variable speed in an ECM is important because blowers need to adjust speed to deliver the airflow needed by the HVAC system.

Known ECMs have various modes of operation, and external control circuits determine an operating point of the ECM. In one mode of operation, Pulse Width Modulation (PWM) signals are transmitted to the electrical interface to control motor speed, motor torque and airflow produced by the motor. The operating point of the ECM is determined by an internal microprocessor control circuit that directly responds to a status of various control input lines.

SUMMARY OF THE INVENTION

Methods and apparatus for interfacing an electronically commutated motor to an HVAC system controller are described. In one aspect of the invention, the method includes an interface circuit coupled to the system controller and the electric motor and includes the steps of receiving commands from the controller, adjusting a voltage to a desired level, outputting the voltage signal through a motor control circuit to control the electric motor, receiving a voltage from the electric motor, and transmitting the received voltage to the controller.

In another aspect of the invention, an HVAC system includes an electronically commutated motor electrically coupled to the interface circuit, which is electrically connected to the system controller. The HVAC system receives commands from the controller, adjusts a voltage to a desired level, outputs the voltage signal through a motor control circuit to control the electric motor, receives a voltage from the electric motor through the motor control circuit, and transmits the received voltage to the controller.

In another aspect of the invention, the interface circuit is electrically connected to the HVAC controller and the electronically commutated motor. The interface circuit includes a controller circuit and a motor control circuit. The controller circuit includes a transmitter circuit and a receiver circuit, and the controller circuit interfaces with the HVAC controller. The motor control circuit includes a transmitter circuit having a first optocoupler and a receiver circuit having a second optocoupler. The motor control circuit interfaces with the electronically commutated motor. After receiving commands from the HVAC controller, the interface circuit adjusts a level of the voltage signal to a desired level, outputs an electrical signal through the first optocoupler, and receives an electrical response from the electronically commutated motor through the second optocoupler. The interface circuit in addition to controlling the electronically commutated motor, interrogates the electronically commutated motor to acquire status and diagnostic information.

As a result, a cost-effective and reliable electrical interface circuit, including a motor circuit and a receiver circuit, to electrically couple a controller to an electronically commutated motor is provided.

DETAILED DESCRIPTION

Figure 1:
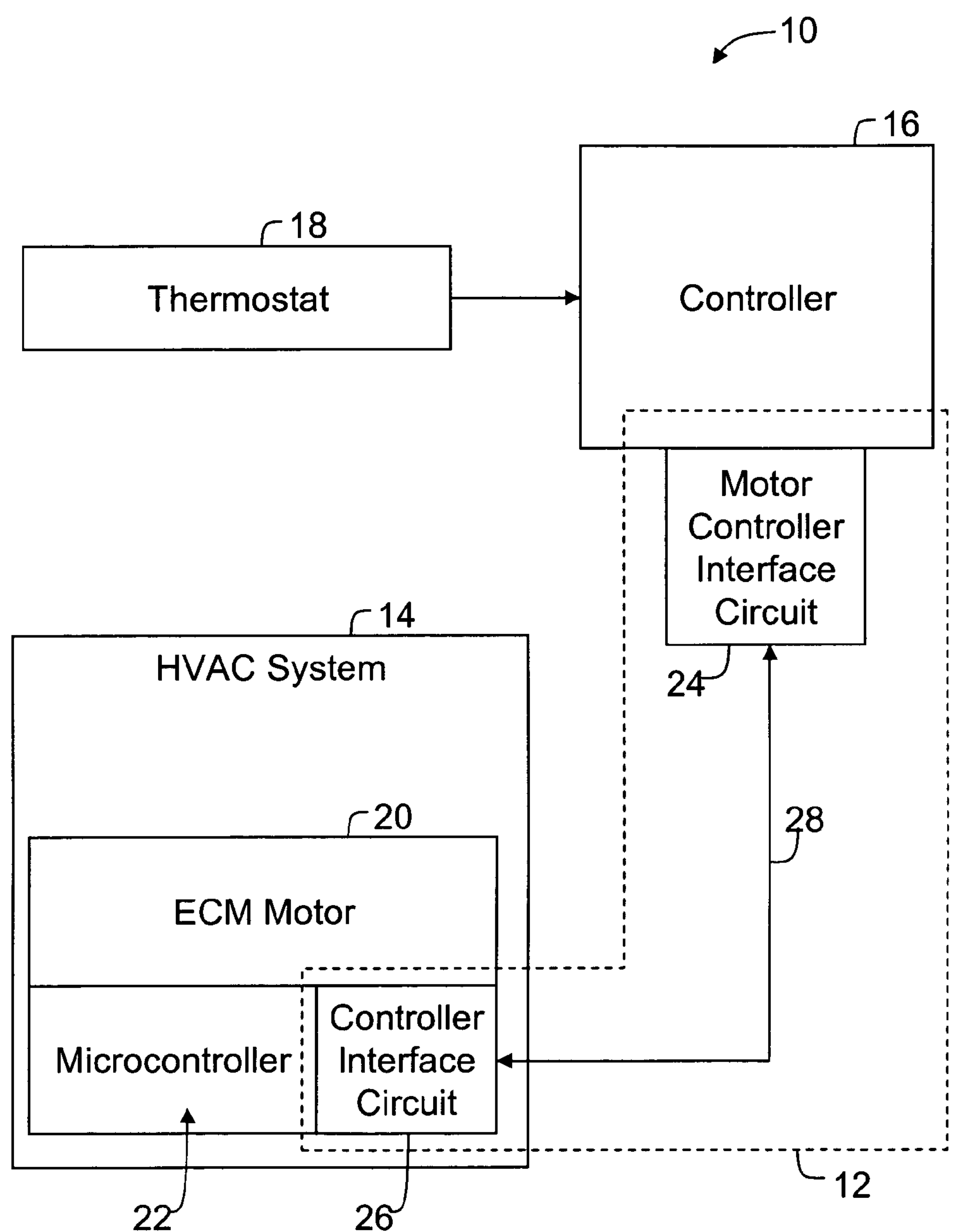
FIG. 1 is an exemplary embodiment of a system block diagram.

FIG. 1 is an exemplary system block diagram 10 of an electrical interface circuit 12 connected to a HVAC system 14 and a controller 16, which is connected to a thermostat 18. HVAC system 14 includes an electronically commutated motor 20 (ECM) including a microcontroller 22. In one embodiment, ECM 20 is a variable speed ECM. Interface circuit 12 includes a controller interface circuit 24 and a motor control interface circuit 26. Motor control interface circuit 26 is connected to microcontroller 22 within ECM 20. HVAC system 14 communicates with ECM 20 through controller interface circuit 24 via a serial communications link 28, e.g., a shielded cable. In another embodiment, controller interface circuit 24 communicates with motor control interface circuit 26 via a wireless digital communications link (not shown). In yet another embodiment, control interface circuit 24 communicates with motor control interface circuit 26 using wireless technology, e.g., infrared and RF technology (not shown). Interface circuit 12 receives information from controller 16 as to a specific torque, speed, or airflow ECM 20 is to be set based on a desired temperature from thermostat 18. In one embodiment, interface circuit 12 is a digital interface.

Figure 2:
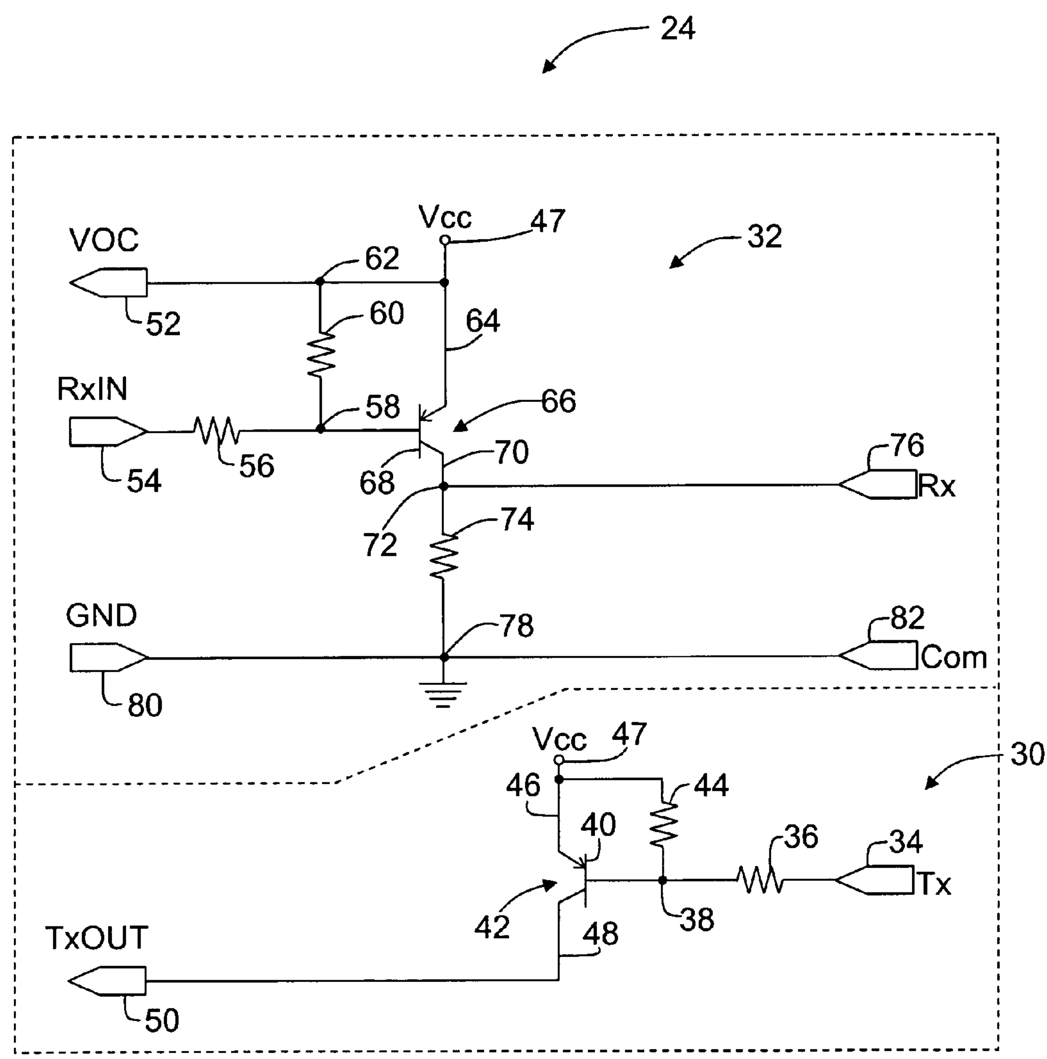
FIG. 2 is an exemplary embodiment of a schematic diagram of a controller interface circuit.

FIG. 2 is an exemplary embodiment of a schematic diagram for controller interface circuit 24. Controller interface circuit 24 includes a transmit circuit 30 and a receive circuit 32. Controller transmit circuit 30 includes a Tx terminal 34 connected to a resistor 36 that is connected to a node 38. Node 38 is connected to a base 40 of transistor 42. Node 38 is also connected to a resistor 44 that is connected to an emitter 46 of transistor 42. A power supply 47 is connected to emitter 46 of transistor 42. A collector 48 of transistor 42 is connected to a TxOut terminal 50.

Controller receive circuit 32 includes a power terminal 52 and a RxIN terminal 54. RxIN terminal 54 is connected to a resistor 56 that is connected to a node 58. Resistor 60 is connected between node 58 and a node 62. Node 62 is connected to power terminal 52 and power supply 47. Node 62 is connected to an emitter 64 of transistor 66 and node 58 is connected a base 68 of transistor 66. A collector 70 of transistor 66 is connected to a node 72 that is connected to a resistor 74 and a Rx terminal 76. Resistor 74 is tied to a node 78 that is tied to ground, a ground terminal 80, and a common terminal 82.

Of course, controller interface circuit 24 is not limited to practice in HVAC system 10 and can be utilized in connection with many other types and variations of controllers, besides controller 16 (shown in FIG. 1).

Figure 3:
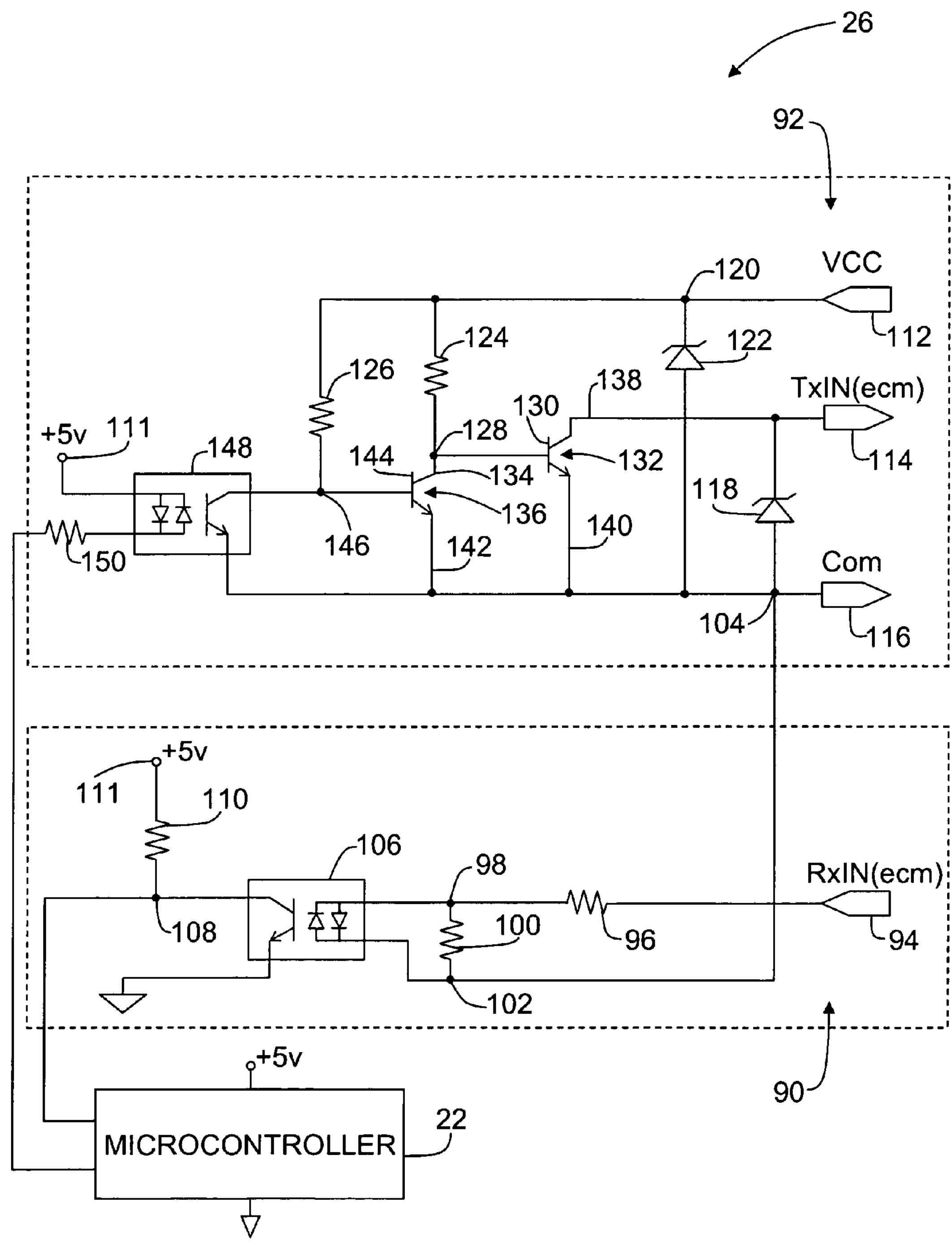
FIG. 3 is an exemplary embodiment of a schematic diagram of a motor control circuit.

FIG. 3 is an exemplary embodiment of a schematic diagram for motor control interface circuit 26. Motor control interface circuit 26 includes a receive circuit 90 and a transmit circuit 92. Motor receive circuit 90 includes a terminal RxIN 94 connected to a resistor 96. Resistor 96 is connected to a node 98. Resistor 100 is connected between node 98 and a node 102. Node 102 is connected to motor transmit circuit 92 at node 104. Nodes 98 and 102 are connected to an optocoupler 106. Optocoupler 106 is connected to a node 108, which is connected to a resistor 110 and microcontroller 22. Resistor 110 is connected to a power supply 111.

Motor transmit circuit 92 includes a power terminal VCC 112, a transmit terminal TxIN 114, and a ground terminal COM 116. A zener diode 118 is connected between TxIN terminal 114 and COM terminal 116. Terminal VCC 112 is connected to a node 120, which is connected to a zener diode 122 and resistors 124 and 126. Zener diode 122 is connected to a node 104, which is connected to terminal COM 116. Resistor 124 is connected to a node 128 which is connected to a base 130 of transistor 132 and a collector 134 of transistor 136. A collector 138 of transistor 132 is connected to terminal TxIN 114 and an emitter 140 of transistor 132 is connected to node 104. Collector 134 of transistor 136 is connected to base 130 of transistor 132 via node 128, and an emitter 142 of transistor 136 is connected to node 104. A base 144 of transistor 136 is connected to a node 146. Node 146 is connected to resistor 126 and to an optocoupler 148 that is connected to node 104. Optocoupler 148 is also connected to power supply 111 and to a resistor 150, which is connected to microcontroller 22.

Controller interface circuit 24 is electrically connected by a serial cable 28 to motor control circuit 26. In one embodiment, the connection of controller interface circuit 24 to motor control circuit 26 enables controller 16 to communicate with ECM 20. Serial cable 28 in one embodiment is a four-wire serial interface. In one embodiment, serial cable 28 has a length of ten feet. In an alternative embodiment, serial cable 28 has a length of one-hundred feet. Referring specifically to FIG. 2 and FIG. 3, in one embodiment, controller receiver circuit 32 is electrically connected to motor transmitter circuit 92, and controller transmitter circuit 30 is electrically connected to motor receiver circuit 90. In order for controller interface circuit 24 to send and receive messages to/from motor control circuit 26, TxOut terminal 50 is connected to RxIN terminal 94, ground terminal 80 is connected to COM terminal 116, RxIN terminal 54 is connected to TxIN terminal 114, and VCC terminal 52 is connected to VCC terminal 112.

Controller interface circuit 24 accepts signals from controller 16 (shown in FIG. 1). Once a signal is received from controller 16, the signal is converted to a voltage level that can be accepted by ECM 20. In one embodiment, the signal is converted by controller interface circuit 24 to at least an infrared signal, an RF signal, and digitally encoded over a power line prior to output to motor control interface 26. In one embodiment, controller interface circuit 24 and motor control interface 26 are configured for bi-directional communication with one another. In one embodiment, motor control interface 26 is configured to accept at least one of a voltage signal, an infrared signal, an RF signal, and a digitally encoded power line signal. Motor receiver circuit 90 accepts the signal from controller transmitter circuit 30 and transmits the signal through optocoupler 106 to ECM 20. ECM 20 then responds by transmitting a voltage signal to motor transmitter circuit 92. In one embodiment, ECM 20 transmits at least one of an infrared signal and a RF signal to motor transmit circuit 92. The transmitted signal is converted by motor transmit circuit 92 and transmitted to controller receiver circuit 32 where the signal is adjusted to a voltage level to communicate with controller 16.

In addition, motor control interface circuit 26 provides isolation between controller 16 and ECM 20. Microcontroller 22 in one embodiment, is not isolated from an AC powerline (not shown). Optocouplers 106 and 148 are, therefore, utilized to isolate motor control interface circuit 26 from microcontroller 22. The interface between control interface circuit 24 and motor control circuit 26 is a four-wire serial interface. The four-wire serial interface is utilized for noise immunity.

Electrical interface 12 commands ECM 20 (shown in FIG. 1) to be configured in various embodiments, e.g., as a constant torque machine, a constant airflow machine, or a constant speed machine. As a constant torque machine, motor torque is regulated by controlling motor current, regardless of operating speed. When operating as a constant torque machine, torque production is linearized and speeds are compensated over the motor's operating speed/torque plane. When operating as a constant airflow machine, a set of constants that describe HVAC system 14 for constant airflow are downloaded to motor 20. The constants optimize ECM 20 operation to provide more accurate airflow regulation in a given operating region. Therefore, as a constant airflow machine, ECM 20 acts as an airflow sensor delivering constant airflow for a given system. As a constant speed machine, ECM 20 will regulate speed regardless of torque requirements provided that a maximum torque value is not exceeded.

In alternative embodiments, interface circuit 12 controls operating profiles, delay profiles, slew rates, speed limit, dynamic braking and control of inrush current of ECM 20. In an alternative embodiment, interface circuit 12 interrogates ECM 20 to determine operating status, operating speed, operating torque, input power consumption, under speed condition, and a time of operation at a given power level. In yet another embodiment, interface circuit 12 can access read/write data and program data to control memory of ECM 20.

In another embodiment, interface circuit 12 is connected to residential HVAC furnaces, fan coils, heat pumps, and heat recovery ventilators. In still another embodiment, interface circuit 12 is connected to residential HVAC air conditioners (not shown) where a blower motor (not shown) is connected to a HVAC system controller (not shown).

In an additional embodiment, interface circuit 12 is used in a clean room environment (not shown). In a further embodiment, interface circuit 12 is used in a commercial variable air volume system (not shown). When used in a clean room environment or in a commercial variable air volume system, a dedicated controller (not shown) is electrically connected to interface circuit 12, or a centralized controller (not shown) is connected to interface circuit 12 to provide individual control via a common communications bus (not shown).

As a result, a cost-effective and reliable electrical interface circuit, including a motor control interface circuit and a controller interface circuit, that couples a controller to an ECM is provided.

While the invention has been described in terms of various specific embodiments, those skilled in the art will recognize that the invention can be practiced with modification within the spirit and scope of the claims.

The invention claimed is:

1. A method for interfacing an electric motor to a controller using an electrical interface circuit, the interface circuit including a controller circuit and a motor control circuit, the controller circuit including a transmitter circuit and a receiver circuit, the motor control circuit including a transmitter circuit and a receiver circuit, and the interface circuit electrically coupled to the controller and the electric motor, said method comprising the steps of:

coupling the motor control circuit directly to the electric motor, wherein the motor control circuit is separate from the controller;

adjusting a level of a first signal received from the controller that is separate from a thermostat configured to communicate a temperature to the controller;

converting, by the interface circuit, the first signal received from the controller to generate a second signal including a digitally encoded signal and at least one of an infrared signal and a radio frequency (RF) signal, wherein the controller is coupled via the interface circuit to a microcontroller located within the electric motor comprising an electronically commutated motor;

outputting the second signal to control the electric motor, wherein said outputting the second signal comprises outputting, by the interface circuit, the digitally encoded signal to the microcontroller within the electronically commutated motor;

receiving, by the motor control circuit, a third signal from the electric motor; and transmitting the third signal from the electric motor to the controller.

2. A method in accordance with claim 1 further comprising receiving the first signal, wherein said step of receiving the first signal comprises the step of the controller circuit receiving electrical signals from the controller.

3. A method in accordance with claim 1 wherein said step of adjusting a level of the first signal comprises the step of adjusting the level to communicate with the electronically commutated motor.

4. A method in accordance with claim 1 wherein said step of outputting the second signal comprises the step of isolating a transmit signal to the electric motor.

5. A method in accordance with claim 1 wherein said step of outputting the second signal further comprises the step of interrogating the electric motor to acquire status and diagnostic information.

6. A method in accordance with claim 5 wherein said step of interrogating the electric motor further comprises the step of acquiring at least one of an operating status, an operating speed, an operating torque, an input power consumption, an under-speed condition, and a time of operation above a desired power level from the electric motor.

7. A method in accordance with claim 1 wherein said step of outputting the second signal further comprises the step of commanding the electric motor to operate as at least one of a constant torque motor, a constant airflow motor, and a constant speed motor.

8. A method in accordance with claim 1 wherein said step of outputting the second signal comprises the step of controlling at least one of an operating profile, a delay profile, a slew rate, a speed limit, dynamic braking, and an inrush current of the electric motor.

9. A method in accordance with claim 1 wherein said step of receiving a third signal comprises the step of isolating a receive signal from the electric motor.

10. A method in accordance with claim 1 wherein said step of transmitting the third signal comprises the step of converting an electrical signal from the electric motor to at least one of an infrared signal and an RF signal.

11. A method in accordance with claim 1 wherein the interface circuit is directly coupled to the controller.

12. A method in accordance with claim 1 wherein the controller is located outside the electronically commutated motor.

13. An electrical interface circuit comprising:

a controller interface circuit configured to communicate signals with a controller, said controller interface circuit including a first transmitter circuit and a first receiver circuit, said electrical interface circuit further configured to convert a voltage signal to a digitally encoded signal and at least one of an infrared signal and an RF signal, said controller coupled via said electrical interface circuit to a microcontroller located within an electric motor comprising an electronically commutated motor, wherein said electrical interface circuit configured to output the digitally encoded signal to the microcontroller within the electronically commutated motor; and a motor control interface circuit directly coupled to said electric motor and coupled to said controller interface circuit, said motor control interface circuit comprising a second transmitter circuit and a second receiver circuit, is separate from said controller, and configured to receive signals generated by said electric motor.

14. An electrical interface circuit in accordance with claim 13 wherein said electrical interface circuit configured to adjust a voltage signal received from said controller to a desired level to communicate with said electric motor.

15. An electrical interface circuit in accordance with claim 14 wherein said electrical interface circuit configured to adjust the voltage level to communicate with said electric motor, said electronically commutated motor configured as an electronically commutated variable speed motor.

16. An electrical interface circuit in accordance with claim 13 wherein said electrical interface circuit configured to adjust a voltage signal received from said electric motor to a desired level to communicate with said controller.

17. An electrical interface circuit in accordance with claim 13 wherein said electrical interface circuit configured to isolate a transmit signal to said electric motor and isolate a receive signal from said electric motor.

18. An electrical interface circuit in accordance with claim 13 wherein said second transmitter circuit comprises a first optocoupler.

19. An electrical interface circuit in accordance with claim 18 wherein said first optocoupler configured to provide noise immunity by isolating said second transmitter circuit from said electric motor.

20. An electrical interface circuit in accordance with claim 13 wherein said second receiver circuit further comprises a second optocoupler.

21. An electrical interface circuit in accordance with claim 20 wherein said second optocoupler configured to provide noise immunity by isolating said second receiver circuit from said electric motor.

22. An electrical interface circuit according to claim 13 wherein said motor control interface circuit electrically connected to said controller interface circuit using at least one of a serial four-wire communications cable, a wireless interface, and a digital wireless interface.

23. An electrical interface circuit in accordance with claim 13 wherein said electrical interface circuit configured to interrogate said electric motor to acquire status and diagnostic information.

24. An electrical interface circuit in accordance with claim 13 wherein said electrical interface circuit configured to command said electric motor to operate as at least one of a constant torque motor, a constant airflow motor, and a constant speed motor.

25. An electrical interface circuit in accordance with claim 13 wherein said electrical interface circuit configured to interrogate said electric motor to acquire at least one of an operating status, an operating speed, an operating torque, an input power consumption, an under-speed condition, and a time of operation above a desired power level.

26. An electrical interface circuit in accordance with claim 13 wherein said electrical interface circuit configured to control at least an operating profile, a delay profile, a slew rate, a speed limit, dynamic braking, and an inrush current of said electric motor.

27. An electrical interface circuit according to claim 13 wherein said motor control interface circuit configured for bi-directional communication with said controller interface circuit using at least one of a voltage signal, an infrared signal, and a RF signal.

28. An electrical interface circuit according to claim 13 wherein said controller interface circuit configured for bi-directional communication with said motor control interface circuit using at least one of a voltage signal, an infrared signal, and a RF signal.

29. An electrical interface circuit according to claim 13 wherein said controller interface circuit configured to convert at least one of an infrared signal and an RF signal to a voltage signal.

30. An electrical interface circuit for a HVAC system comprising an electronically commutated motor, said electrical interface comprising:

a controller interface circuit configured to communicate signals with a controller, said controller interface circuit including a first transmitter circuit and a first receiver circuit, said electrical interface circuit configured to convert a voltage signal to a digitally encoded signal and at least one of an infrared signal and an RF signal, said controller coupled via said electrical interface circuit to a microcontroller located within an electronically commutated motor, wherein said electrical interface circuit configured to communicate the digitally encoded signal to the microcontroller within the electronically commutated motor; and a motor control interface circuit directly coupled to said electronically commutated motor and coupled to said controller interface circuit, said motor control interface circuit coupled to said controller interface circuit by using a serial four-wire communications cable, said motor control interface circuit including a second transmitter circuit and a second receiver circuit, is separate from said controller, and configured to receive signals from said electronically commutated motor, said second transmitter circuit including a first optocoupler, and said second receiver circuit including a second optocoupler, said first and second optocouplers configured to isolate signals between said motor control interface circuit and said electronically commutated motor, and said electrical interface circuit configured to interrogate said electronically commutated motor to acquire status and diagnostic information.

31. An electrical interface circuit in accordance with claim 30 wherein said electrical interface circuit configured to command said electronically commutated motor to operate as at least one of a constant torque motor, a constant airflow motor, and a constant speed motor.

32. An electrical interface circuit in accordance with claim 30 wherein said electrical interface circuit configured to interrogate said electronically commutated motor to acquire at least one of an operating status, an operating speed, an operating torque, an input power consumption, an under-speed condition, and a time of operation above a desired power level.

33. An electrical interface circuit accordance with claim 30 wherein said electrical interface circuit configured to control at least an operating profile, a delay profile, a slew rate, a speed limit, dynamic braking, and an inrush current of said electronically commutated motor.

34. An electrical interface circuit for a HVAC system comprising an electronically commutated motor, said electrical interface comprising:

a controller interface circuit configured to communicate signals with a controller, said controller interface circuit including a first transmitter circuit and a first receiver circuit, said electrical interface circuit configured to convert a voltage signal to a digitally encoded signal and at least one of an infrared signal and an RF signal, said controller coupled via said electrical interface circuit to a microcontroller located within an electronically commutated motor, wherein said electrical interface circuit configured to communicate the digitally encoded signal to the microcontroller within the electronically commutated motor; and a motor control interface circuit directly coupled to said electronically commutated motor and coupled to said controller interface circuit, said motor control interface circuit coupled to said controller interface circuit by using a digital wireless interface, said motor control interface circuit including a second transmitter circuit and a second receiver circuit, is separate from said controller, and configured to receive signals from said electronically commutated motor, said second transmitter circuit including a first optocoupler, said second receiver circuit including a second optocoupler, said first and second optocouplers configured to isolate signals between said motor control interface circuit and said electronically commutated motor, and said electrical interface circuit configured to interrogate said electronically commutated motor to acquire status and diagnostic information.

35. An electrical interface circuit according to claim 34 wherein said motor control interface circuit configured for bi-directional communication with said controller interface circuit using at least one of a voltage signal, an infrared signal, and a RF signal.

36. An electrical interface circuit according to claim 34 wherein said controller interface circuit configured for bi-directional communication with said motor control interface circuit using at least one of a voltage signal, an infrared signal, and a RF signal.

37. An electrical interface circuit according to claim 34 wherein said controller interface circuit configured to convert at least one of an infrared signal and an RF signal to a voltage signal.

38. An electrical interface circuit in accordance with claim 34 wherein said electrical interface circuit configured to command said electronically commutated motor to operate as at least one of a constant torque motor, a constant airflow motor, and a constant speed motor.

39. An electrical interface circuit in accordance with claim 34 wherein said electrical interface circuit configured to interrogate said electronically commutated motor to acquire at least one of an operating status, an operating speed, an operating torque, an input power consumption, an underspeed condition, and a time of operation above a desired power level.

40. An electrical interface circuit accordance with claim 34 wherein said electrical interface circuit configured to control at least an operating profile, a delay profile, a slew rate, a speed limit, dynamic braking, and an inrush current of said electronically commutated motor.

* * * * *